Patented Apr. 3, 1951

2,547,113

UNITED STATES PATENT OFFICE 2,547,113

PRODUCTION OF POLY-ESTER-AMIDES

James Gordon Napier Drewitt, Spondon, near Derby, and Gordon Frank Harding, London, England, assignors to Celanese Corporation of America, a corporation of Delaware No Drawing. Application December 2, 1947, Serial No. 789,323. In Great Britain December 16, 1946

6 Claims. (Cl. 260—75)

This invention relates to the production of polymers, and more particularly to the production of polyester-amides.

A number of different types of condensation polymers are at present known, for example polyesters formed from dihydroxy compounds and dicarboxylic acids or from hydroxy-carboxylic acids, and polyamides formed from diamines and dicarboxylic acids or from aminocarboxylic acids. It is frequently desirable for the purpose of obtaining a compromise in properties, or for the purpose of developing special properties, to form interpolymers by co-condensation of two different polymer-forming substances or two different sets of polymer-forming substances which can severally form polymers. Thus, for example, polyester-amides may be formed from a mixture of a glycol, a diamine and a dicarboxylic acid; from a mixture of a hydroxy-carboxylic acid, a dicarboxylic acid and a diamine; or from a mixture of a glycol, a dicarboxylic acid and an aminocarboxylic acid; or from an amino alcohol and two or more dicarboxylic acids.

The interpolymers are produced by mixing together the initial reagents in the appropriate proportions and heating them. In some cases, however, it is found that the product is very far from homogeneous, and sometimes actual separation takes place during the polymerisation. Thus, for instance, in making a polyester-amide from benzidine, a dicarboxylic acid such as adipic acid, and a glycol such as ethylene glycol, the original mixture is substantially homogeneous and yet at a fairly early stage during the polymerisation a separation of a solid phase takes place, and thereafter it is impossible to obtain a homogeneous polymer. It seems probable that this is due to the formation of a polymer from the benzidine and the dicarboxylic acid, with or without a small amount of ethylene glycol, which is substantially insoluble in the remainder of the polymerisation mixture. This phenomenon considerably restricts the choice of raw materials available for the production of polyester-amides by this process. Again, even where an actual separation of this type does not take place during the polymerisation, there is frequently evidence that the polymer is far from uniform in the sense that the constituents are uniformly distributed along the polymer chain.

We have found that, in the production of polyester-amides from more than two bifunctional reagents which are capable, when condensed separately, of forming separate polymers having melting point and solubility characteristics which differ widely from one another, much better results are obtained if the constituent or one of the constituents necessary to form the polymer or polymers of higher melting point or lower solubility is added only after a preliminary condensation has been carried out with the remaining constituents. Thus in the specific instance mentioned above, we find that very much better results are obtained by first condensing the dicarboxylic acid, such as adipic acid, with the glycol, such as ethylene glycol, and, only after the condensation has proceeded a fair way, adding the benzidine and continuing the heating. We find that by this means there is no tendency for a separation of any polymeric substance or salt during the polymerisation, and furthermore the product is possessed of very much better properties. In particular, using adipic acid, ethylene glycol and a proportion of benzidine equal to 10 mole percent on the adipic acid, we are able to obtain a fusible polymer which can readily be drawn into filaments having very desirable properties. Using the older method of mixing all the constituents at the beginning and heating up, we obtained a soft heterogeneous mass which appeared to contain some solid material and which on further heating only melted with decomposition and from which fibres could not be drawn. The same applies to forming a polymer from benzidine, decane-diol and sebacic acid.

This principle of adding one of the constituents of the final polymer only after forming a low polymer from the remainder of the constituents is thus of very considerable value in forming polymers having improved properties. The principle may be applied generally to the production of polyester-amides from three or more components. The constituents which are most likely to lead to actual separation during the condensation polymerisation, or to polymers having very obvious heterogeneity, are those which, when formed into a homo-polymer, give rise to polymers of very high melting point or which are substantially insoluble in the common solvents. For instance, in the case mentioned, the polymer from benzidine and either adipic acid or sebacic acid is extremely high melting and has very low solubility in the common polyamide solvents and appears to be completely insoluble in a mixture of glycol and dicarboxylic acid or in the polyester formed therefrom. It is presumably this factor which accounts for the separation of a solid phase during the polymerisation.

Other diamines which share this property with benzidine include para-phenylene diamine, 2-methyl-benzidine, ortho-tolidine, 5,5'-dichlor-ortho-tolidine, 3,3'-diethyl-benzidine, meta-tolidine, 3,5,3',5'-tetra-methyl-benzidine, 3,3'-diamino-4,4'-dimethyl-diphenyl-methane and the corresponding 6,6'-dimethyl compound, 4,4'-diamino-stilbene, 4.4'-diamino-diphenyl-sulphone, 4.4'-diamino-dibenzyl - sulphone, 4.4' - diamino-3.3'-dimethyl-dibenzyl - sulphone, 1.2.3.4 - tetrahydro-1.5-naphthalene diamine, 1.2.3.4-tetrahydro-5.8-naphthalene diamine, 1.3-, 1.4- and 1.6-naphthalene diamines and the 5-, 6- and 7-methyl derivatives of 1.3-naphthalene diamine. All these diamines contain the amino groups attached to rings, and further they are all characterised in that their N,N'-diacetyl derivatives melt at temperatures above 230° C. Most of the diacetyl derivatives have much higher melting points, e. g. do not melt below 270 or 280° C.

A similar phenomenon is encountered in the production of polyester-amides when using certain dicarboxylic acids, for example terephthalic acid, 2.5-dichlor-terephthalic acid, 2.6-dimethyl-terephthalic acid, 4.4'-diphenic acid, 4.4'-dicarboxy-diphenyl sulphone, 4.4'-dicarboxy-3.3'-dimethyl-diphenyl, 4.4'-dicarboxy-dibenzyl, α-β-bis-4-carboxyphenoxy-ethane, thiophene-2.5-dicarboxylic acid, pyrane-2.6-dicarboxylic acid, N-methyl-pyrrole-2.5-dicarboxylic acid and pyridine-2.5-, 2.6- and 3.5-dicarboxylic acids. All the dimethyl esters of these dicarboxylic acids melt at a temperature above 110° or 120° C. and most of them do not melt below 130 or 140° C. When condensing a hydroxy-carboxylic acid with a dicarboxylic acid of this type and a diamine, or when condensing a glycol and a dicarboxylic acid of this character and an amino-carboxylic acid, separation of a solid phase is likely to occur, and again it is desirable to add the terephthalic acid or similar dicarboxylic acid to the mixture only after a preliminary condensation of the other constituents has been carried out.

Diamines whose N.N'-diacetyl derivatives melt at above 230° C. and dicarboxylic acids whose dimethyl esters melt at above 110° C. are referred to collectively in the present specification as "high melting constituents."

The invention is of particular importance when the high melting constituent or constituents added to the already condensed constituents are used in only a minor proportion of the total constituents, for instance a proportion of 5 or 10 molar percent up to 15 or 20 or even 25 molar percent on the other constituents. It may, however, be used for the production of polyester-amides containing still higher proportions of the high melting constituents, e. g. up to 50 molar percent or more. Particularly with molar percentages of such constituents in excess of about 20%, it may be of advantage to add the higher melting constituents in stages while further polymerising between the stages or to add them gradually while continuing the polymerisation.

As regards the other constituents of the polymers, apart from the high melting constituents, we may use any suitable glycols, dicarboxylic acids, diamines, hydroxycarboxylic acids, aminocarboxylic acids and amino-alcohols. The two reactive groups mentioned are the sole reactive groups present in the reagent. These two reactive groups may be joined by divalent radicals which are wholly hydrocarbon in character, or by reagents in which the chain joining the two polar groups contains, in addition to carbon, such linking atoms or groups as oxygen, sulphur, sulphone and the like. Generally we prefer to use reagents in which the reactive groups are joined by a succession of methylene groups, as for example in ethylene glycol, trimethylene glycol, tetramethylene glycol, hexamethylene glycol and the like, and the corresponding compounds in which the reactive groups are two carboxy groups, two amino groups, an amino and a carboxy group, a hydroxy and a carboxy group, or an amino group and a hydroxy group.

Instead of the reagents specified above, amide- or ester-forming derivatives thereof may be used. For example instead of glycols we may employ the esters of the glycols with formic acid or other volatile monocarboxylic acid, instead of diamines their amide-forming derivatives such as the formyl derivatives or the corresponding iso-cyanates, and, instead of dicarboxylic acids, their amide-forming derivatives, for example their methyl, phenyl or other esters with volatile hydroxy compounds, their amides, or their mixed anhydrides with volatile monocarboxylic acids.

The polyester-amides, and particularly those formed from a glycol, a dicarboxylic acid and a diamine of the benzidine type, are capable of yielding filaments which show very pronounced elastic properties, as is illustrated in the following example:

Example

A mixture of 1 molecular proportion of adipic acid and 2 molecular proportions of ethylene glycol was heated first in a nitrogen stream at 150° C. for 2 hours, then at 210° for 5 hours, and finally at 240–250° C. for 4 hours under a pressure of 4 mms. To the polymer thus obtained, 0.1 molecular proportion of benzidine was added, and the mixture heated at 250° C. for 15 minutes in a slow stream of nitrogen. Heating was continued at 250° C. for 6 hours at a pressure of 0.4 mm. The product melted to a clear homogeneous melt and from a melt at 210° C. fibres could be drawn which, after cold-drawing, showed very considerable snap elasticity.

The polymers of the invention may be used for the production of lacquers or other coating compositions, and, if of sufficiently high molecular weight, for the production of films or filaments. The choice of the method of spinning filaments depends in part on the properties of the polymers. If soluble in appropriate organic solvents, they may be spun by dry or wet methods. Generally, however, the filaments can be obtained by melt spinning methods, i. e. by extruding the melt of the polymer through suitable orifices. The polyester-amides are of particular value for the production of elastic filaments. To obtain products of high molecular weight the general rule is to use the reagents so that complementary reactive groups are present in substantially equivalent proportions. Thus, in the case of making a polyester-amide from a glycol, a diamine and a dicarboxylic acid, the number of carboxy groups present should be approximately equal to the sum of the numbers of hydroxy groups and amino groups. Where, however, a reagent is used which is volatile under the reaction conditions, such as a volatile glycol, this reagent may be used in excess of the amount mentioned and the excess allowed to evaporate during the condensation.

Having described our invention, what we desire to secure by Letters Patent is:

1. Process for the production of poly-ester-amides by condensation of more than two bifunctional reagents free from reactive groups other than the two functional groups, including 5 to 50 molar percent of a single high-melting constituent selected from the class consisting of aromatic primary diamines whose diacetyl derivatives do not melt below 230° C. and dicarboxylic acids whose dimethyl esters do not melt below 110° C.

and the amide-forming derivatives of such acids, the functional groups of said reagents being mutually complementary and comprising members selected from each of the following classes, namely (a) amino groups carrying hydrogen atoms, (b) hydroxy groups and their ester-forming derivatives, and (c) carboxy groups and their ester- and amide-forming derivatives, comprising first condensing the reagents other than said high-melting constitutent until the reaction mixture formed by mixing the liquid condensate with the high-melting constituent remains homogeneous throughout subsequent condensation, adding the high-melting constituent and completing the condensation, the condensation being carried out so that the amino groups and the hydroxy-groups and their ester-forming derivatives react with substantially equivalent proportions of the carboxy groups and their ester- and amide-forming derivatives.

2. Process for the production of poly-esteramides by condensation of more than two bifunctional reagents free from reactive groups other than the two functional groups, including 5 to 50 molar percent of a single high-melting constituent selected from the class consisting of aromatic primary diamines whose diacetyl derivatives do not melt below 230° C. and dicarboxylic acids whose dimethyl esters do not melt below 110° C. and the amide-forming derivatives of such acids, the functional groups of said reagents being mutually complementary and comprising members selected from each of the following classes, namely (a) primary amino groups, (b) hydroxy groups and their ester-forming derivatives, and (c) carboxy groups and their ester- and amide-forming derivatives, comprising first condensing the reagents other than said high-melting constituent until the reaction mixture formed by mixing the liquid condensate with the high-melting constituent remains homogeneous throughout subsequent condensation, adding the high-melting constituent and completing the condensation, the condensation being carried out so that the primary amino groups and the hydroxy groups and their ester-forming derivatives react with substantially equivalent proportions of the carboxy groups and their ester- and amide-forming derivatives.

3. Process for the production of poly-esteramides by condensation of a diamine containing at least one hydrogen atom attached to the nitrogen of each amino group and free from reactive groups other than the amino groups, a glycol free from reactive groups other than the hydroxy groups and a dicarboxylic acid free from reactive groups other than the carboxy groups wherein one and only one of the materials condensed is a high-melting constituent selected from the class consisting of aromatic primary diamines whose diacetyl derivatives do not belt below 230° C. and dicarboxylic acids whose dimethyl esters do not melt below 110° C., said high-melting constituent being employed in an amount of 5 to 50 molar percent, comprising first condensing the reagents other than said high-melting constituent until the reaction mixture formed by mixing the liquid condensate with the high-melting constituent remains homogeneous throughout subsequent condensation, adding the high-melting constituent and completing the condensation, the condensation being carried out so that the diamine and the glycol react with substantially equivalent proportions of the dicarboxylic acid.

4. Process according to claim 3 wherein there is employed a polymethylene glycol, a polymethylene dicarboxylic acid and as the high-melting constituent benzidine, and wherein the condensation is continued until a filament-forming polymer is produced.

5. Process for the production of poly-esteramides by condensation of a diamine containing at least one hydrogen atom attached to the nitrogen of each amino group and free from reactive groups other than the amino groups, a glycol free from reactive groups other than the hydroxy groups and a dicarboxylic acid free from reactive groups other than the carboxy groups, one and only one of the materials condensed being a high-melting constituent selected from the group consisting of aromatic primary diamines whose diacetyl derivatives do not melt below 230° C. and dicarboxylic acids whose dimethyl esters do not melt below 110° C., said high-melting constituent being present in a proportion of 5 to 25 molar percent, comprising first condensing the reagents other than said high-melting constituent until the reaction mixture formed by mixing the liquid condensate with the high-melting constituent remains homogeneous throughout subsequent condensation, adding the high-melting constituent and continuing the condensation, the condensation being carried out so that the diamine and the glycol react with substantially equivalent proportions of the dicarboxylic acid.

6. Process for the production of poly-esteramides by condensation of a diamine containing at least one hydrogen atom attached to the nitrogen of each amino group and free from reactive groups other than the amino groups, a glycol free from reactive groups other than the hydroxy groups and a dicarboxylic acid free from reactive groups other than the carboxy groups, one and only one of the materials condensed being a high-melting constituent selected from the group consisting of aromatic primary diamines whose diacetyl derivatives do not melt below 230° C. and dicarboxylic acids whose dimethyl esters do not melt below 110° C., said high-melting constituent being present in a proportion of 5 to 25 molar percent, and the total carboxy groups in the mixture being substantially equal in number to the sum of the numbers of the hydroxy and amino groups, comprising first condensing the reagents other than said high-melting constituent until the reaction mixture formed by mixing the liquid condensate with the high-melting constituent remains homogeneous throughout subsequent condensation, adding the high-melting constituent and continuing the condensation until a filament-forming polymer is produced, the condensation being carried out so that the diamine and the glycol react with substantially equivalent proportions of the dicarboxylic acid.

JAMES GORDON NAPIER DREWITT.
GORDON FRANK HARDING.

REFERENCES CITED

The following references are of record in the file of this patent:

UNITED STATES PATENTS

| Number | Name | Date |
|---|---|---|
| 2,224,037 | Brubaker et al. | Dec. 3, 1940 |
| 2,333,639 | Christ et al. | Nov. 9, 1943 |

OTHER REFERENCES

Ser. No. 397,741, Schlack (A. P. C.), published April 20, 1943.